US009104966B2

(12) United States Patent
Pande et al.

(10) Patent No.: US 9,104,966 B2
(45) Date of Patent: Aug. 11, 2015

(54) SELF CONFIGURING KNOWLEDGE BASE REPRESENTATION

(71) Applicant: Tata Consultancy Services Limited, Mumbai, Maharashtra (IN)

(72) Inventors: Arun Pande, Maharashtra (IN); Sunilkumar Kopparapu, Maharashtra (IN)

(73) Assignee: Tata Consultancy Services Limited (IN)

( * ) Notice: Subject to any disclaimer, the term of this patent is extended or adjusted under 35 U.S.C. 154(b) by 257 days.

(21) Appl. No.: 13/663,149

(22) Filed: Oct. 29, 2012

(65) Prior Publication Data

US 2013/0132327 A1    May 23, 2013

(30) Foreign Application Priority Data

Nov. 23, 2011    (IN) .......................... 3294/MUM/2011

(51) Int. Cl.
    *G06N 5/02*    (2006.01)
(52) U.S. Cl.
    CPC ...................................... *G06N 5/022* (2013.01)
(58) Field of Classification Search
    None
    See application file for complete search history.

(56) References Cited

U.S. PATENT DOCUMENTS 7,805,401 B2 * 9/2010 Toner ............................ 707/610

7,805,461 B2 * 9/2010 Gadamsetty et al. ......... 707/797
8,233,715 B2 * 7/2012 Matsushita et al. ........... 382/190
2003/0126136 A1   7/2003 Omoigui
2010/0057688 A1   3/2010 Anovick
2010/0057762 A1   3/2010 Hatami-Hanza

OTHER PUBLICATIONS

Patcharee Thongtra, Finn Arve Aagesen, Natenapa Sriharee, "Ontology-based Capabilty Self-Configuration", IFIP International Federation for Information Processing, Issues: 14th Eunice Open European Summer School 2008, 2008, pp. 1-7.*
Gjergji Kasneci, Jurgen Van Gael, Ralf Herbrich, and Thore Graepel, "Bayesian Knowledge Corroboration with Logical Rules and User Feedback", Proceeding ECML PKDD'10 Proceedings of the 2010 European conference on Machine learning and knowledge discovery in databases: Part II, Sep. 2010, pp. 1-18.*
Jiawei Han, Yandong Cai, and Nick Cercone, "Knowledge Discovery in Databases: An Attribute-Oriented Approach", VLDB '92 Proceedings of the 18th International Conference on Very Large Data Bases, Aug. 24-27, 1992, pp. 547-559.*
Yan Tang, Jan Demey, Robert Meersman, "A Self-configuring Semantic Decision Table", Research Challenges in Information Science (RCIS), 2011 Fifth International Conference on, May 19-21, 2011, pp. 1-9.*

(Continued)

*Primary Examiner* — Kakali Chaki
*Assistant Examiner* — Walter Hanchak
(74) *Attorney, Agent, or Firm* — Merchant & Gould P.C.

(57) ABSTRACT

A self configuring knowledge representation system and method is presented which self configures based on the external stimuli in order to answer the query in a way best suited to the user. The domain knowledge representation here is by way of graphs that allows the knowledge to self configure based on the query intent to give "specific" to the query answers.

10 Claims, 3 Drawing Sheets

(56) References Cited

OTHER PUBLICATIONS

Ding, Z. and Peng, Y:"A probabilistic extension to the web ontology language OWL", Thirty-Seventh Hawaii International Conference on System Sciences (HICSS-37), Big Island, Hawaii, Jan. 5-8, 2004, pp. 1-26.*

Lopez et al. "AquaLog: An Ontology-portable Question Answering System for the Semantic Web" 2005—http://citeseer.ist.psu.edu/viewdoc/summary?doi=10.1.1.98.4605.

Lopez et al. "AquaLog: An ontology-driven Question Answering system as an interface to the Semantic Web" 2005—http://citeseer.ist.psu.edu/viewdoc/summary?doi=10.1.1.141.4059.

Ribeiro De Azevedo et al. "An Autonomic Ontology-Based Multiagent System for Intrusion Detection in Computing Environments", International J. for Infonomics (IJI), vol. 3. Issue 1. 2010. pp. 182-189.

* cited by examiner

|  | Jan | Feb | Mar | Apr | May | Jun | Jul | Aug | Sep | Oct | Nov | Dec |
|---|---|---|---|---|---|---|---|---|---|---|---|---|
| North | | | | | | | | | | | | |
| South | | ■ | ■ | ■ | ■ | | | | | | | |
| East | | | | | | ■ | ■ | ■ | ■ | | | |
| West | | | | | | | | | | | | |

Figure 3

SELF CONFIGURING KNOWLEDGE BASE REPRESENTATION

This application claims benefit of Serial No. 3294/MUM/2011, filed 23 Nov. 2011 in India and which application is incorporated herein by reference. To the extent appropriate, a claim of priority is made to the above disclosed application.

FIELD OF THE INVENTION

The present invention generally relates to the field of knowledge management systems and, more particularly, to a self configuring dynamic knowledge base representation and presentation system specific to the user.

BACKGROUND OF THE INVENTION

Knowledge management, in a typical business organization, is needed for achieving organization's primary objectives of improved business performance and to attain a competitive edge over others by adopting knowledge management as a strategic asset for gaining insights and experiences. In general, the process of knowledge management and acquisition demands a research level understanding of the subject domain such that the documents retrieved using search engines is digitally read and comprehensively analyzed. However, this does not imply that a researcher is all time capable of coming up with a most optimum solution to a given query, for he may have overlooked some of the other associated important aspects that were desirable to consider or he may not be able to capture the events that gets dynamically associated with any subject which may be valuable to contribute towards the attainment of optimal solution.

In some applications, Question Answering (QA) systems do use knowledge base in the form of ontologies to retrieve the most relevant document or information pertaining to the query. Ontology is a way to represent knowledge within a specific domain. This system is well documented in the existing prior arts. For example, Aqua-Log is a QA system which takes queries expressed in natural language and ontology as input and returns answers drawn from the available semantic markup. Other existing prior art discusses building an ontology for agriculture domain specifically. However the ontology used in the above arts are fixed, irrespective of external stimuli. This approach often leads to a "general" answer and not "specific to the question" answer. This is because QA systems are developed for certain domain and are anticipated to answer queries related to specific domain and not to specific person who is asking the query. None of the existing literature discusses the representation of knowledge such that it configures itself based on the external stimuli in order to answer the query specifically and satisfactorily.

For personalized response one should have access to a system that enables them to see a relationship between the domain knowledge and the external stimuli. Currently there is no systematic way of retrieving distilled knowledge from vast repositories of knowledge available over the internet. In the light of foregoing there is a need in the art for a knowledge management system that is easy to navigate and is capable of configuring itself in response to the query issued by the user along with the external stimuli in order to provide a solution/knowledge that best matches the user inquisition.

OBJECTIVES OF THE INVENTION

The principle object of the present invention is to provide a system capable of discovering and retrieving knowledge from a vast pool of data that can match the query in a best possible way.

Another significant object of the invention is to construct a self configuring knowledge base representation system that can respond to the query specific to the user.

It is another object of the present invention to provide a self configuring knowledge representation system that effectively takes into consideration the external events associated with the query, thereby providing the most optimal response.

Another object of the invention is to enable quick, reliable and effective knowledge retrieval by facilitating knowledge distillation wherein the system considers the external events governing the query by way of self configuration.

Yet another object of the invention is to assist question answering system in providing "specific to the question answer" by making it adaptable to the knowledge representation system very quickly.

SUMMARY OF THE INVENTION

Before the present methods, systems, and hardware enablement are described, it is to be understood that this invention is not limited to the particular systems, and methodologies described, as there can be multiple possible embodiments of the present invention which are not expressly illustrated in the present disclosures. It is also to be understood that the terminology used in the description is for the purpose of describing the particular versions or embodiments only, and is not intended to limit the scope of the present invention which will be limited only by the appended claims.

The present invention envisages a system and an automated method of knowledge representation which self configures based on external stimuli or events so that the knowledge representation is such that it is able to answer a query in the best possible way.

In the preferred embodiment of the invention an automated method of retrieving response to an inquiry specific to a user using a dynamic knowledge base representation is presented, wherein the method comprises the steps of:
receiving one or more inquiry from the user over a communication network; inspecting an environment pertaining to the inquiry for extracting one or more corresponding external event and knowledge related to the said inquiry; modeling a representation of extracted knowledge such that the knowledge representation is self configured based on the associated external event; and responding to the inquiry by using the reconfigured knowledge base representation.

One of the other preferred embodiments of the present invention discloses a dynamic self configuring knowledge representation system configured for retrieving user specific response to an inquiry by a user, wherein the system comprises of: an input module for receiving one or more inquiry from one or more user; an inspecting module for extracting one or more corresponding external event and knowledge related to the said inquiry; a module for modeling a representation of extracted knowledge such that the knowledge representation is self configured based on the associated external event; and a display means for presenting the user specific query by using the reconfigured knowledge base representation.

BRIEF DESCRIPTION OF THE DRAWINGS

The foregoing summary, as well as the following detailed description of preferred embodiments, are better understood when read in conjunction with the appended drawings, wherein like elements are given like reference numerals. For the purpose of illustrating the invention, there is shown in the drawings example constructions of the invention; however, the invention is not limited to the specific methods and system disclosed. In the drawings:

FIG. 3 is an exemplary illustration of a table, according to an embodiment of the present invention.

DETAILED DESCRIPTION OF THE INVENTION

Some embodiments of this invention, illustrating all its features, will now be discussed in detail.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

The disclosed embodiments are merely exemplary of the invention, which may be embodied in various forms. Software programming code, which embodies aspects of the present invention, is typically maintained in permanent storage, such as a computer readable medium. In a client-server environment, such software programming code may be stored on a client or a server. The software programming code may be embodied on any of a variety of known media for use with a data processing system. This includes, but is not limited to, magnetic and optical storage devices such as disk drives, magnetic tape, compact discs (CD's), digital video discs (DVD's), and computer instruction signals embodied in a transmission medium with or without a carrier wave upon which the signals are modulated. For example, the transmission medium may include a communications network, such as the Internet. In addition, while the invention may be embodied in computer software, the functions necessary to implement the invention may alternatively be embodied in part or in whole using hardware components such as application-specific integrated circuits or other hardware, or some combination of hardware components and software. Input/output or I/O devices (including but not limited to keyboards, displays, pointing devices, etc.) can be coupled to the system either directly or through intervening I/O controllers. Further, a computerized method refers to a method whose steps are performed by a computing system containing a suitable combination of one or more processors, memory means and storage means.

Figure 1:
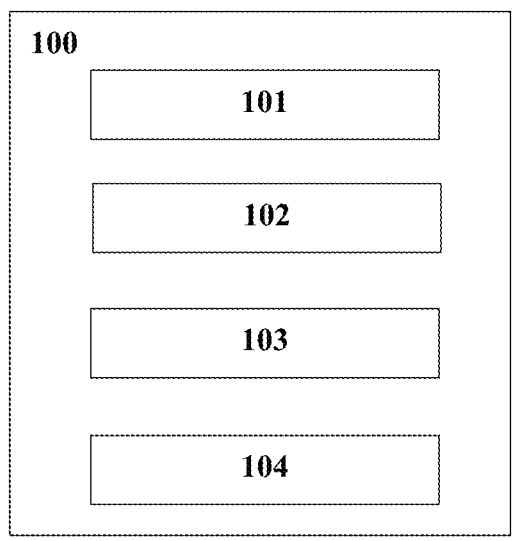
FIG. 1 illustrates block diagram of a dynamic self configuring knowledge representation system in accordance with one of the preferred embodiments of the present invention.
Figure 2:
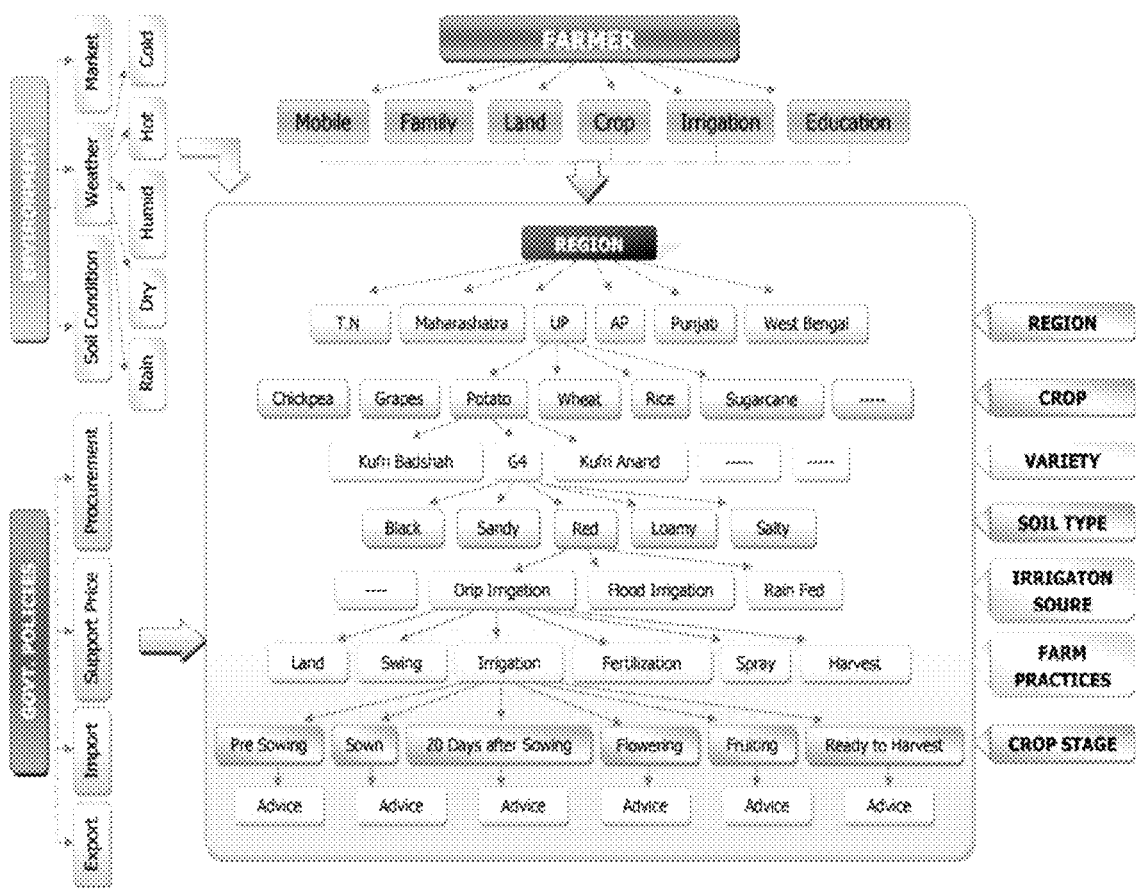
FIG. 2 is a representation of knowledge using graph nodes and edges in accordance with one of the disclosed illustrations of the present invention.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

The present invention envisages an automated method of knowledge representation which self configures based on external stimuli so that the knowledge representation is such that it is able to answer a query in the best possible way. The central idea is to construct ontology or a knowledge representation system that is self configurable, the configurability being triggered by the content of the query, the time of the query, the origin of the query, and other available meta data or external stimuli data in all forms namely past, current and future (or predicted) etc. The idea being that a self configurable ontology captures the context more precisely and hence is able to assist the QA system point to an appropriate answer more quickly and reliably. In essence, the self configured ontology captures the environment that exists at the destined location and this enables answering even a fuzzy or an incomplete query. Further, the ontology dynamically adjusts itself so that it is most relevant to the query. This dynamism assists the QA system to perform with higher precision and hence imitating an expert to bring out the most "relevant" answer.

Referring to FIG. 1, a block diagram of the system capable of realizing the present invention is depicted. The system 100 comprises of a network of computer modules that are communicatively linked by a networking system like wires, wireless communication links or fiber optic cables. The network system here refers to the internet representing a worldwide collection of networks and gateways that use the Transmission Control Protocol/Internet Protocol (TCP/IP) suite of protocols to communicate with one another. The internet enables high speed communication between the network computers and gets implemented either by intranet, a local area network (LAN), or a wide area network (WAN). Further, the users for the purposes of the present invention may be personal computers or network computers.

The system 100 comprises of an input module 101 that is configured to receive the inquiry from the user and activate the interactive features of the system 100. The input module can pass the data to the inspecting module 102 that can analyze the received inquiry and extract the context and the intent of the inquiry along with the meta data information associated with the inquiry. The Meta data information may comprise of dynamically varying external events vis a vis origin of the query, time of the query and other such information relevant to the inquiry in addition to the past, current and future data related to the query. The inspecting module 102 selects the relevant answers or pages while reject that in different context by determining the weights of the edges in the knowledge base and the nodes which best suits the query. The analyzing and determining weights of the edge feature of the inspecting module 102 establishes a link between the knowledge nodes; before transference to another communicatively coupled module 103. The module 103 enables the system 100 return only those answers that match those concepts thereby improving the precision of information retrieval, and improvements in the user interface. The searches conducted may possibly include web-based database searches or the search based on established links between the knowledge nodes. Off-line searches are also covered within the purview of the present invention.

The module 103 is responsible for modeling a representation of extracted knowledge in the form of a graph. Specifically, the ontology here is looked upon as a graph (or a tree) comprising of multiple nodes (graph nodes) representing knowledge states and edges, wherein the nodes are the concepts identified by the inspecting module 102 and related to the domain, which are further related to the entities; whereas the edges connecting the concepts and the entities are associated with a strength, in a weak sense, a probability measure. This strength of the edges is dependent upon the extracted concepts from the meta data. Each knowledge state is active or inactive depending upon the stimuli in the inquiry which could be in the form of environment relevance and the intent of the inquiry. The edge which denotes the path between the two nodes is governed by conditional probabilities which could further change according to the conditions (both external and internal) governing the inquiry. This results in a complex set of structured logical connections that provides a specific knowledge about the knowledge states within a particular domain.

The significant and distinguishing feature of the module 103 is that it is able to utilize the extracted stimuli or external events, as discussed above, to enable self configuration of the knowledge representation system 100. This is achieved by combining (by way of calculating a sum total) the edge weights dependent on external stimuli (conditional probabilities) and the node (active or inactive) that results in a configured ontology that is best suited to answer the inquiry. The reconfigured knowledge base representation leads to an answer "specific to the inquiry" and not only relevant to the domains, as in case of typical ontologies which consist of knowledge obtained from humans who are experts in a particular domain.

The display module 104 then displays the response to the user inquiry by using the reconfigured knowledge base representation system. In one embodiment a graphic user interface may display the user specific response. A user may derive understanding from the results displayed on the interface and utilize the functionality therein.

BEST MODE/EXAMPLE OF WORKING OF THE INVENTION

The preceding description has been presented with reference to various embodiments of the invention. Persons skilled in the art and technology to which this invention pertains will appreciate that alterations and changes in the described structures and methods of operation can be practiced without meaningfully departing from the principle, spirit and scope of this invention.

With reference now to FIG. 2, an illustrative representation of knowledge using graph nodes and edges is presented. The system 100 is constituted of various computer modules in which computer usable code or instructions implementing the processes may be located for the illustrative embodiments. The embodiment is illustrated from an agricultural domain whereby the user can be a farmer or a researcher or a breeder and any other person holding interest in the said domain. According to an embodiment illustrated in FIG. 2, a graph is presented that comprises of nodes representing concepts related to the domain, like "HARVESTING" which are related to the entities like "PADDY" and the edge deriving a link between the two nodes or the concepts and the entities are associated with a weighted strength, so determined by the conditional probabilities. This strength of the edge connecting the concept and the entity is dependent on among other things like: the time of the year (season). For example it could be fully connected (probability 1) in the actual harvesting season (say September) and could be not connected (probability 0) in say December. Similarly, the connectivity between the concept and the entity could be 0 for a query coming from a non paddy growing region (say Punjab) and 1 when the query comes from a paddy growing region (say West Bengal). In this particular example, the strength of the connectivity between the concept "HARVESTING" and the entity "PADDY" would be the product of all these conditional probabilities, season and region. Namely the strength of the edge between "Harvesting" and "Paddy" would be P (season) *P (region).

Referring now to FIG. 3, which represents an illustrative embodiment in the form of a table for an Indian subcontinent, it can be derived that the connect between the concept "HARVEST" and the entity "PADDY" is maximum for a query coming from East region of the Indian sub-continent and in the month of September (shown by red) and is less for the months of August, July and June and probably not connected for the rest of the months (shown in green) for the same region. As illustrated, for the South region, there is a strong connectivity between the concept and the entity in the months of May, April, March and February. In a similar vein, as shown in FIG. 3, there is no connection between the concept HARVESTING and entity PADDY when a query originates from the West region (one of the reason could be that there is no paddy grown in the West Region).

After the user posts his inquiry via an input module 101, the inspecting module 102 extracts information including the meta information associated with the query, for example the origin, time of the year, region, season of harvesting, the crop variety to be grown, crop stage, irrigation source, farm practices, weather conditions vis a vis humidity, rainfall, soil conditions and so on. The concept is then modeled by the module 103 in the form of graph with nodes and edges. While each node represents knowledge state that can be active or inactive depending on the stimuli or external event in the inquiry, for say, environmental conditions, governmental policies and the intent of the inquiry; edges represents the connectivity between the two nodes wherein the edge strength is determined by the conditional probabilities. These conditional would change according to number of farmers, their farming practices, language, weather, and market condition, spatial and temporal variation of all these parameters. Sensors (electronic, human, crowd sourcing, farmer centric feeding of data etc) would help us to compute the conditional probabilities. The edge weights (conditional probabilities) and the node (active or inactive) as a sum total is now utilize to determine the "configured" ontology that is best suited to answer the query.

Shown below is the example for a "CONFIGURED ONTOLOGY" based on Region

O<REGION=eastern UP, TIME=October>=$O_{full}$<CROP=potato, wheat, vegetables;
  TIME=October, 2011;
  WEATHER=daytime temperatures in 30s, night-time temperatures in 20s, dry;
  FARM OPERATIONS=ready to sow potato, wheat sown a week back, vegetables are ready to harvest;>

The above embodiment configures the complete ontology ($O_{full}$) based on the region. For a stimuli "REGION=eastern UP", only the CROP nodes "potato, wheat, ..." would be active and based on the season only certain FARM OPERATIONS (ready to sow, ...) will be active. Thus an ontology would be reconfigured to O <REGION=eastern UP, TIME=October>.

The other embodiment of the present invention shows an example of a "CONFIGURED ONTOLOGY" based on Inquiry Details O<REGION=eastern UP (state of Indian Sub-continent), FARMER=x>=Q<CROP=potato;
  SEED=kufri anand (variety type);
  TIME=Third week of October;
  PLACE=Pratapgad (say is in UP);
  WEATHER=max temp-37, min temp-23, humidity-70%, SOIL=color red, major nutrient-N=,P=, K=, Micro nutrient-CA=, BO=, . . . ; Moisture=;
FARM OPERATION=organic fertilizer applied=200 kg, seeds treatment= . . . ; >

In the above embodiment the inquiry triggers the activity of the nodes and the weights of the edges which are based on personal information about the farmer (FARM OPERATIONS, SOIL etc) in addition to the REGION information.

In effect, every query had information that act as stimuli to reconfigure the ontology. This reconfiguration helps in making the ontology best suited to address the query. So a query from the same region but from a farmer who has sown seeds for potatoes on day D (October 20) and the farmer who has sown seeds on day D−7 (October 13) would be very different.

The foregoing description of specific embodiments of the present invention has been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents. The listing of steps within method claims do not imply any particular order to performing the steps, unless explicitly stated in the claim.

We claim:

1. A method for retrieving a response to a query using a knowledge base representation, the method comprising:
    configuring, via a processor, a knowledge base representation comprising a plurality of nodes and a plurality of edges, wherein a node of the plurality of nodes denotes a knowledge state, and wherein an edge of the plurality of edges denotes a path between two nodes;
    receiving, via the processor, a query from a user over a communication network;
    extracting, via the processor, metadata from the query, wherein the metadata comprises content of the query, origin of the query, time of the query and personal information of the user;
    re-configuring, via the processor, the knowledge base representation by
    designating at least one node, present in the knowledge base representation, either as an active node or an inactive node, wherein the at least one node is designated based upon the metadata,
    assigning a weight corresponding to at least one edge based upon conditional probabilities associated with the at least one edge, wherein the conditional probabilities indicates measure of connectivity between nodes connected via the at least one node, and wherein the conditional probabilities are measured based upon the metadata and
    obtaining a reconfigured knowledge base representation based upon the designation of the at least one node and the weight corresponding to the at least one edge; and
    retrieving a response specific to the user by using the reconfigured knowledge base representation.

2. The method of claim 1, wherein the knowledge base representation is used in the form of an ontology, wherein the ontology further comprises concepts and entities represented in form of the plurality of nodes in the knowledge base representation, and wherein connection between the concepts and the entities are represented in form of the plurality of edges in the knowledge base representation.

3. The method of claim 1, wherein the weight is assigned based on a product of the conditional probabilities associated with the at least one edge.

4. A system for retrieving a response to a query using a knowledge base representation, the system comprising:
    a processor; and
    a memory coupled to the processor, wherein the processor is capable of executing program instructions stored in the memory in order to
        configure a knowledge base representation comprising a plurality of nodes and a plurality of edges, wherein a node of the plurality of nodes denotes a knowledge state, and wherein an edge of the plurality of edges denotes a path between two nodes;
        receive a query from a user;
        extract metadata from the query, wherein the metadata comprises content of the query, origin of the query, time of the query and personal information of the user;
    re-configure the knowledge base representation by
        designating at least one node, present in the knowledge base representation, either as an active node or an inactive node, wherein the at least one node is designated based upon the metadata,
        assigning a weight corresponding to at least one edge based upon conditional probabilities associated with the at least one edge, wherein the conditional probabilities indicates measure of connectivity between nodes connected via the at least one node, and wherein the conditional probabilities are measured based upon the metadata and
    obtaining a reconfigured knowledge base representation based upon the designation of the at least one node and the weight corresponding to the at least one edge;
    obtaining a reconfigured knowledge base representation based upon the designation of the at least one node and the weight corresponding to the at least one edge; and
    retrieve a response specific to the user by using the reconfigured knowledge base representation.

5. The system of claim 4, wherein the weight is assigned based on a product of the conditional probabilities associated with the at least one edge.

6. The method of claim 1, wherein each conditional probability has a value within a range of 0-1, wherein the value '1' indicates full connectivity amongst the nodes, and wherein the value '0' indicates no connectivity amongst the nodes.

7. The system of claim 4, wherein each conditional probability has a value within a range of 0-1, wherein the value '1' indicates full connectivity amongst the nodes, and wherein the value '0' indicates no connectivity amongst the nodes.

8. A non-transitory computer readable medium embodying a program executable in a computing device for retrieving a response to a query using a knowledge base representation, the program comprising instructions for:
    configuring a knowledge base representation comprising a plurality of nodes and a plurality of edges, wherein a node of the plurality of nodes denotes a knowledge state, and wherein an edge of the plurality of edges denotes a path between two nodes;
    receiving a query from a user over a communication network;
    extracting metadata from the query, wherein the metadata comprises content of the query, origin of the query, time of the query and personal information of the user;

re-configuring, via the processor, the knowledge base representation by
  designating at least one node, present in the knowledge base representation, either as an active node or an inactive node, wherein the at least one node is designated based upon the metadata,
  assigning a weight corresponding to at least one edge based upon conditional probabilities associated with the at least one edge, wherein the conditional probabilities indicates measure of connectivity between nodes connected via the at least one node, and wherein the conditional probabilities are measured based upon the metadata and
  obtaining a reconfigured knowledge base representation based upon the designation of the at least one node and the weight corresponding to the at least one edge; and
retrieving a response specific to the user by using the reconfigured knowledge base representation.

9. The computer readable medium of claim 8, wherein each conditional probability has a value within a range of 0-1, wherein the value '1' indicates full connectivity amongst the nodes, and wherein the value '0' indicates no connectivity amongst the nodes.

10. The computer readable medium of claim 8, wherein the weight is assigned based on a product of the conditional probabilities associated with the at least one edge.

\* \* \* \* \*